2,518,727

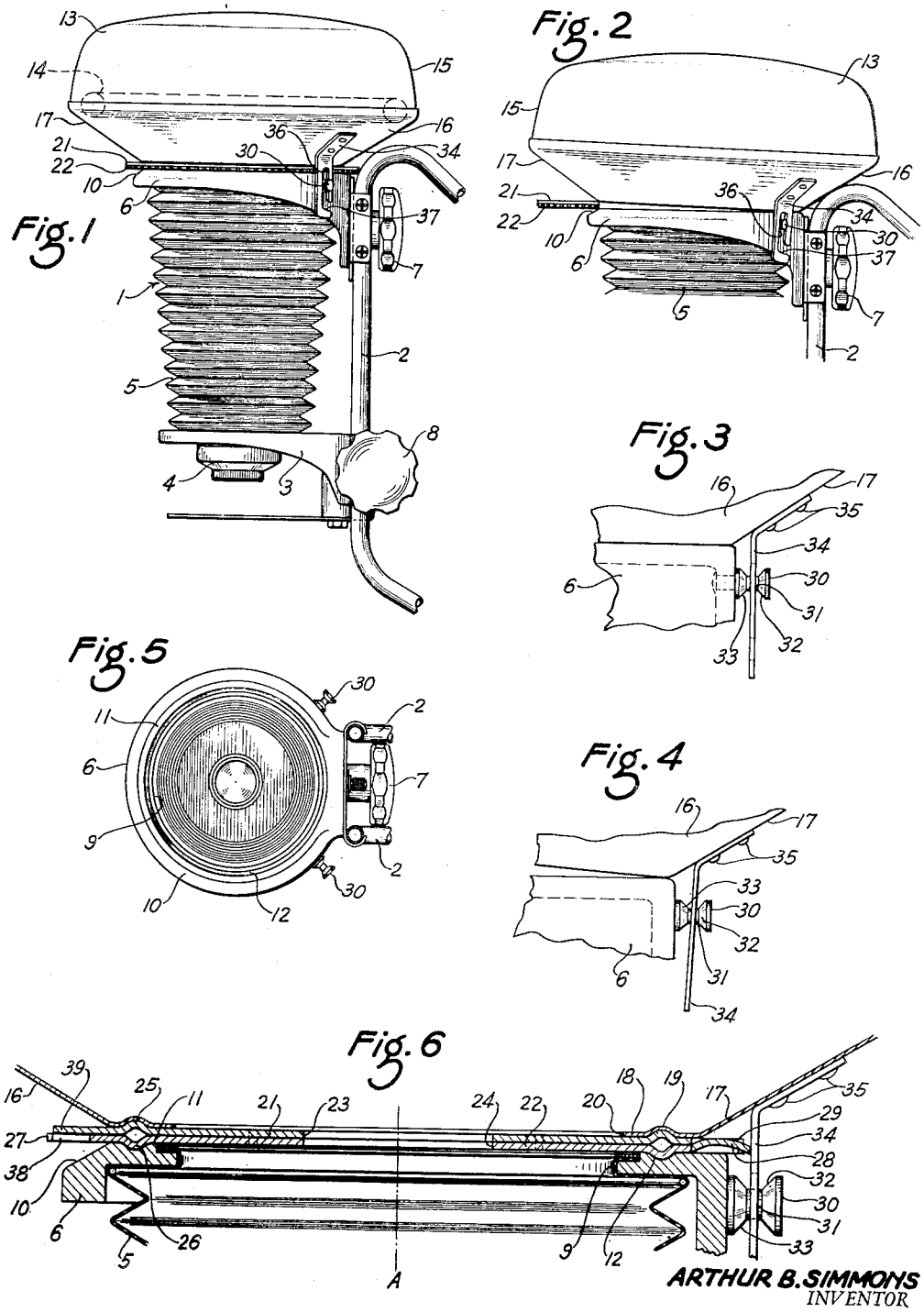
Aug. 15, 1950 A. B. SIMMONS 2,518,727
TRANSPARENCY-POSITIONING DEVICE FOR
PHOTOGRAPHIC APPARATUS
Filed March 26, 1948
ARTHUR B. SIMMONS
INVENTOR
ATTORNEYS Patented Aug. 15, 1950

UNITED STATES PATENT OFFICE 2,518,727

TRANSPARENCY-POSITIONING DEVICE FOR PHOTOGRAPHIC APPARATUS

Arthur B. Simmons, Rochester, N. Y., assignor to Eastman Kodak Company, Rochester, N. Y., a corporation of New Jersey Application March 26, 1948, Serial No. 17,225

9 Claims. (Cl. 88—24)

The present invention relates to photography and more particularly to a transparency-positioning device for photographic apparatus. Such apparatus may be a photographic enlarger or projector. One object of my invention is to provide photographic apparatus with a means to facilitate the insertion and removal of a transparency. Another object of my invention is to provide photographic apparatus in which a lamphouse is rockably mounted on a support to admit the insertion and removal of a transparency, or negative holder. Another object of my invention is to provide an inexpensive arrangement by which a lamphouse may be rockably positioned on a support and by which the lamphouse will be axially positioned when a negative holder is in an operative position. Other objects will appear from the following specification, the novel features being particularly pointed out in the claims at the end thereof.

In photographic apparatus in which transparencies such as negatives are inserted into and removed from a light beam, it has been common practise to provide a negative holder which may slide through an opening into the light beam, this opening usually being provided with springs or other means for holding the negative holder in a fixed position. With such a construction, the negative holder itself must usually be provided with means engaging both sides of the transparency or negative to hold the negative flat and the negative-holding members are usually held together by means of two plates which must usually be latched together. Thus, the operation of placing the negative in the negative holder and placing the negative holder in the light beam usually requires considerable time. In other forms of enlarging apparatus it has been proposed to hold a negative in a negative holder by utilizing the weight of the lamphouse, but in these forms of apparatus a special means has been employed for raising the lamphouse, such as a rack and pinion, so that the negative holder can be inserted and again lowering it after the insertion takes place. My present invention is particularly directed to a means for simplifying the above-mentioned types of apparatus.

Coming now to the drawings wherein like reference characters denote like parts throughout:

Fig. 1 is a side elevation of a photographic enlarging apparatus including a transparency-positioning structure constructed in accordance with and embodying a preferred form of my invention;

Fig. 2 is a fragmentary side elevation showing the relative position of the lamphouse and support as the former rocks upon the latter during the insertion or removal of a negative carrier;

Fig. 3 is a fragmentary detail side elevation showing a lost-motion connection between the support and lamphouse in its Fig. 1 position;

Fig. 4 is a view similar to Fig. 3 but with the parts shown in the Fig. 2 position in which the lamphouse is rocked upon its support;

Fig. 5 is a top plan view of the support with the lamphouse removed; and

Fig. 6 is an enlarged fragmentary sectional view taken through the negative holder, a portion of the lamphouse, and a portion of the support.

My invention comprises broadly a means to facilitate positioning and holding a negative or transparency flat in a light beam for projecting an image on a suitable screen or surface. A simple type of negative holder may be employed in which the transparency is held between two plates which need not be clamped together but which are held together by gravity through the lamphouse resting upon the negative holder and pressing the negative holder upon a support. The lamphouse is mounted to rock through a limited angle on the support so that the negative holder may be self-centering and no external or supplementary means is required to raise the lamphouse relative to the support, since both the lamphouse and support have guides for directing the negative holder into an operative position.

More specifically, a preferred embodiment of my invention may consist of an enlarging camera shown broadly as 1 in Fig. 1. This enlarging camera may include a supporting frame 2, a lens carrier 3, an objective 4, and the usual bellows 5 connecting the lens carrier to a support 6 which may be adjustable on the track 2 when a knob 7 is turned. Any suitable adjustment of the lens board 3 may take place through a knob 8. As thus far described, the construction is similar to known types of enlargers except for the particular arrangement of the support 6.

As indicated in Fig. 5, the support 6 may consist of a circular frame member having a light opening 9 in the center and having a tapered wall 10 leading up to a flat surface 11 which is circular in shape; this flat surface preferably being provided with a groove 12.

The lamphouse 13 may consist of a flattened, integrating sphere-type of reflector in which a circular fluorescent lamp 14 may be mounted, the lamphouse preferably consisting of an upper section 15 and a lower section 16 having interfitting edges. Section 16 of the lamphouse has a tapered wall 17 leading to a flat surface 18, which flat surface is provided with a groove 19 which can conveniently be embossed in the metal if sheet metal is used as shown. A light opening 20 in the bottom wall is substantially coextensive with the light opening 9 of the support 6.

As indicated in Fig. 6, the negative holder may consist of a pair of flat plates 21 and 22, each having a light opening 23 and 24 which may register with each other, and each having deformations or embossings 25 and 26, here shown as extending in opposite directions. The plates 21 and 22 are preferably circular in shape, one plate having a serrated outer edge 27, and the plates having an interengaging tongue 28 on plate 22 and groove 29 on plate 21, tending to hold the plates in a registering position, as fully shown in the copending application Serial No. 17,226, filed March 26, 1948. The negative holder per se forms no part of the present invention.

Since the relatively flat surfaces 11 of the support 6 and 18 of the lamphouse 13 are preferably circular in shape and normally in contact when a negative holder is not in place, it is necessary to have the lamphouse rock about an axis "A" which preferably passes through the center of the objective 4 and the centers of the support 6 and lamphouse 13. This is accomplished by means of a lost-motion connection between the lamphouse and support which may comprise a pair of "dumb-bell shaped" studs 30 carried by the support 6; these "dumb-bell shaped" studs being both spaced to one side of a line drawn transversely through the centers of the lamphouse and support. These may be spaced approximately one-third of the diameter apart but, in any event, they are spaced well toward one side of the center line above referred to. The studs 30 have a reduced central area 31 and tapering walls 32 and 33 spaced apart so that they may be engaged by brackets 34 attached as by rivets 35 to the lamphouse. These brackets each have a vertical slot 36 and an open notch 37 so that if it is necessary to remove the lamphouse, it may be drawn upwardly and then the lamphouse may be turned to pass the studs out of the open ends 37 of the slots. However, the primary function of these brackets is to permit the lamphouse to rock through a limited angle sufficient not only to pass the negative holder into the light beam, as shown in Fig. 6, but to permit this negative holder, while in position, to be opened so that a strip negative may be drawn through the negative holder as is better shown in the copending application above referred to.

In operation, this structure is extremely simple because the negative holder may be moved into place without any adjustment of the parts whatsoever; the edge of the negative holder being guided between the support 6 and the lamphouse 13 by the tapering walls 10 and 17 and when the negative holder is positioned into an operative position, the lamphouse 13 will rock as shown in Figs. 2 and 4 since the slots 36 of the bracket have a loose connection with the studs 30. As the negative holder is inserted, it is moved inwardly and is more or less directed by the brackets 34 into its operative position in which position the circular embossings 25 and 26 in the plates may engage the circular groove 12 and 19 of the support and lamphouse. Since the enlarging camera is vertically arranged, the lamphouse will settle by gravity into a position in accurate axial alignment with the axis "A" of the enlarger when the embossings and grooves all come into registration. Since the grooves on the lamphouse and support are complemental in shape to the embossings on the negative-holder plates, the lamphouse will snap into place readily through gravity when the light openings 23, 24, and 18 and 9 are in registration. If single negatives or transparencies are used, the negative holder must be withdrawn to replace the negative with another, or if strip negatives are used the interengaging tongue-and-groove portions 28 and 29 or a notch 38 in one edge of the holder may be used to raise the overlying portion 39 of the negative holder so that strip film may be moved to the next transparency area.

It will be noted that my structure is extremely simple, that loading and unloading a negative and passing it into the light beam can be quickly and easily accomplished without manipulating levers or knobs, and that the lamphouse, while only loosely attached to its support, is always accurately aligned axially at the time of use, since the cooperating embossings and complemental-shaped grooves of the negative holder align the lamphouse more accurately with the support when the negative holder is in place than occurs through the loose mounting formed by the brackets 34 and the studs 30. In addition, the brackets and studs prevent the negative holder from being thrust too far into the apparatus during the loading operation and they prevent the lamphouse from being displaced a sufficient distance from the support to fall off the enlarging camera unless the lamphouse is definitely manually moved from the support by utilizing the slot 36 notched at 37 which, of course, requires that the lamphouse be turned after it has been moved from the support a fixed distance.

I claim:

1. Negative-holder positioning device for vertical photographic enlarging apparatus comprising a support having a light opening therein, a lamphouse having a light opening therein, interengaging walls on the support and lamphouse on which the lamphouse may rest by gravity, a lost-motion connection between the frame and the lamphouse through which the lamphouse may rock relative to the support and about the light-opening axis, said lost-motion connection limiting rocking motion about the axis to a predetermined extent for the reception of a negative holder insertable between the support and lamphouse, the negative holder including formations extending above and below the negative holder, a complemental formation in the support and lamphouse for engaging the negative holder formations when the latter is moved to an operative position between the lamphouse and support.

2. Negative-holder positioning device for vertical photographic enlarging apparatus comprising a support having a light opening therein, a lamphouse having a light opening therein, interengaging walls on the support and lamphouse on which the lamphouse may rest by gravity, a lost-motion connection between the frame and the lamphouse through which the lamphouse may rock relative to the support and about the light-opening axis, said lost-motion connection limiting rocking motion about the axis to a predetermined extent, said lost-motion connection including a slotted bracket and a shouldered stud loosely engaging the slotted bracket, the stud and slot having a loose fit whereby angular movement of the lamphouse about an axis passing through the lamphouse may take place.

3. Negative-holder positioning device for photographic enlarging apparatus comprising a support having a light opening therein, a lamphouse having a light opening therein, interengaging walls on the support and lamphouse on which the lamphouse may rest, a lost-motion connection between the frame and the lamphouse through which the lamphouse may rock relative to the support and about the light-opening axis, said lost-motion connection limiting rocking motion about the axis to a predetermined extent, said lost-motion connection including a pair of shouldered studs loosely fitting a pair of slotted brackets both positioned to one side of a line drawn transversely through the center of the lamphouse whereby the lamphouse may rock as a negative carrier is inserted into or removed from an operative position over the light opening in the support.

4. Negative-holder positioning device for vertical photographic enlarging apparatus comprising a support having a light opening therein, a lamphouse having a light opening therein, interengaging walls on the support and lamphouse on which the lamphouse may rest by gravity, a lost-motion connection between the frame and the lamphouse consisting of a slotted bracket loosely engaging a stud through which the lamphouse may rock relative to the support and about the light-opening axis when a negative holder is inserted therebetween, said lost-motion connection limiting rocking motion about the axis to a predetermined extent, said lost motion connection stud and slot being shaped to movably retain the lamphouse on the support until the lamphouse is moved so that the stud passes the length of the slot for removal of the lamphouse from the support.

5. Negative-holder positioning device for vertical photographic enlarging apparatus comprising a support having a light opening therein, a lamphouse having a light opening therein, interengaging walls on the support and lamphouse on which the lamphouse may rest by gravity, a lost-motion connection between the frame and the lamphouse consisting of a slotted bracket loosely engaging a stud through which the lamphouse may rock relative to the support and about the light-opening axis when a negative holder is inserted between the lamphouse and the support, said lost-motion connection limiting rocking motion about the axis to a predetermined extent, said lamphouse having a circular lamp enclosed in a circular reflector with the center of gravity substantially aligned with the axis passing through the light aperture of the support to rock about said axis for the insertion and removal of a negative carrier.

6. Negative-holder positioning device for photographic enlarging apparatus comprising a support having a light opening therein, a lamphouse having a light opening therein, interengaging walls on the support and lamphouse on which the lamphouse may rest, a lost-motion connection between the frame and the lamphouse through which the lamphouse may rock relative to the support and about the light-opening axis, said lost-motion connection limiting rocking motion about the axis to a predetermined extent, said lamphouse having a circular lamp enclosed in a circular reflector with the center of gravity substantially aligned with the axis passing through the light aperture of the support to rock about said axis for the insertion and removal of a negative carrier, circular edges on the support and lamphouse inclined inwardly to form an annular tapered guideway for directing a negative holder between them and into an operative position in the light path.

7. Negative-holder positioning device for photographic enlarging apparatus comprising a support having a light opening therein, a lamphouse having a light opening therein, interengaging walls on the support and lamphouse on which the lamphouse may rest, a lost-motion connection between the frame and the lamphouse through which the lamphouse may rock relative to the support and about the light-opening axis, said lost-motion connection limiting rocking motion about the axis to a predetermined extent, said lamphouse having a circular lamp enclosed in a circular reflector with the center of gravity substantially aligned with the axis passing through the light aperture of the support to rock about said axis for the insertion and removal of a negative carrier, circular edges on the support and lamphouse inclined inwardly to form an annular tapered guideway for directing a negative holder between them and into an operative position in the light path, said negative holder being round in shape and of a larger diameter than the diameter of the inclined edges forming an annular tapered guideway to project therefrom when in an operative position between the support and lamphouse.

8. Negative-holder positioning device for photographic enlarging cameras employing a negative holder comprising a pair of flat plates with light openings therein and circular embossings extending outwardly from each plate, said positioning device comprising a circular support having a flat surface with a circular groove surrounding a light opening therein, a circular lamphouse having a flat surface with a circular groove surrounding a light opening therein, said circular embossings and said circular grooves interfitting, the circular support and lamphouse each having inclined circular walls leading to the flat surfaces to direct a negative holder into an operative position with the light openings and circular embossings and circular grooves all in registration.

9. Negative-holder positioning device for photographic enlarging cameras employing a negative holder comprising a pair of flat plates with light openings therein and circular embossings extending outwardly from each plate, said positioning device comprising a circular support having a flat surface with a circular groove surrounding a light opening therein, a circular lamphouse having a flat surface with a circular groove surrounding a light opening therein, said circular embossings and said circular grooves interfitting, the circular support and lamphouse each having inclined circular walls leading to the flat surfaces to direct a negative holder into an operative position with the light openings and circular embossings and circular grooves all in registration, the support and lamphouse being vertically positioned with the former resting by gravity on the latter, and connections between the support and lamphouse for permitting rocking movement of the lamphouse on the support but normally preventing displacement of the lamphouse from the support.

ARTHUR B. SIMMONS.

REFERENCES CITED

The following references are of record in the file of this patent:

UNITED STATES PATENTS

| Number | Name | Date |
|---|---|---|
| 2,263,025 | Young | Nov. 18, 1941 |
| 2,312,562 | Leonard | Mar. 2, 1943 |